United States Patent
Uitenbroek

[19]

[11] Patent Number: 6,129,069
[45] Date of Patent: Oct. 10, 2000

[54] IGNITION SYSTEM FOR A GAS ENGINE

[75] Inventor: Paul Uitenbroek, Aachen, Germany

[73] Assignees: Motoren-Werke Mannheim AG, Mannheim, Germany; GET Gas Engine Technology B.V., Hoensbroeck, Netherlands

[21] Appl. No.: 09/180,664

[22] PCT Filed: Jun. 11, 1997

[86] PCT No.: PCT/EP97/03034

§ 371 Date: Nov. 12, 1998

§ 102(e) Date: Nov. 12, 1998

[87] PCT Pub. No.: WO97/49907

PCT Pub. Date: Dec. 31, 1997

[30] Foreign Application Priority Data

Jun. 22, 1996 [DE] Germany .......................... 196 24 965

[51] Int. Cl.$^7$ .................................................. F02B 19/02
[52] U.S. Cl. ........................................ 123/292; 123/260
[58] Field of Search .................... 123/260, 292, 123/90.12

[56] References Cited

U.S. PATENT DOCUMENTS

| | | | |
|---|---|---|---|
| 3,945,352 | 3/1976 | Reimuller | 123/34 A |
| 4,300,497 | 11/1981 | Webber | 123/254 |
| 5,067,458 | 11/1991 | Bailey | 123/292 |
| 5,826,558 | 10/1998 | Kawamura | 123/292 |

FOREIGN PATENT DOCUMENTS

| | | |
|---|---|---|
| 0597 713 | 5/1994 | European Pat. Off. . |
| 28 26 807 | 12/1979 | Germany . |
| 2031513 | 4/1980 | United Kingdom . |

Primary Examiner—John Kwon
Attorney, Agent, or Firm—Charles L. Schwab; Hardaway/Mann IP Group

[57] ABSTRACT

An ignition device (22) is positioned in an ignition chamber (21) which in turn is positioned in a prechamber (11) in the cylinder head of an internal combustion engine. A valve controlling flow to and from the ignition chamber is opened to initiate ignition near top dead center of the compression stroke and is closed before the exhaust stroke to trap hot combustion gases in the ignition chamber. Very exacting control of ignition is achieved.

4 Claims, 1 Drawing Sheet

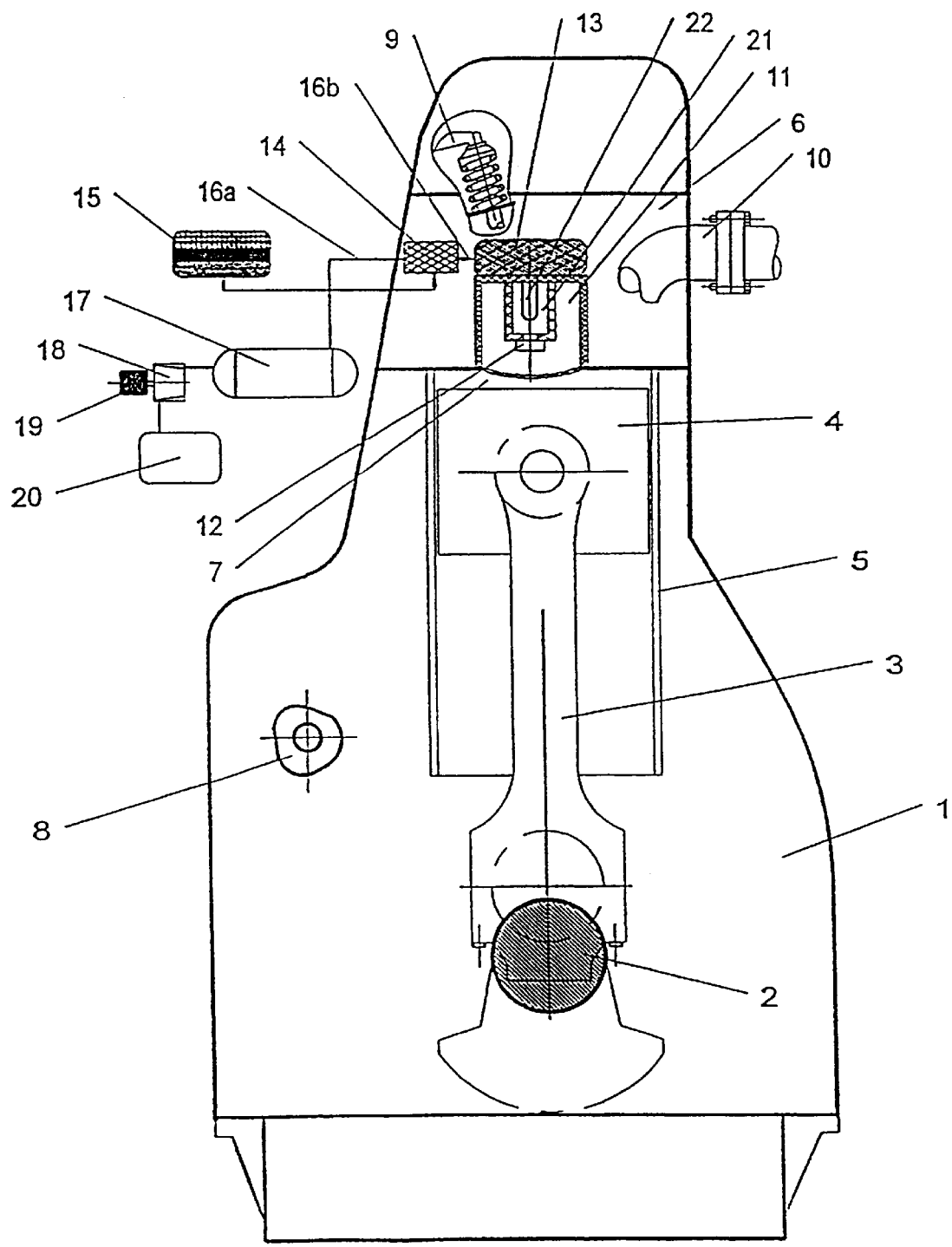

IGNITION SYSTEM FOR A GAS ENGINE

TECHNICAL FIELD

This invention relates to an internal combustion engine and a method for operating such an internal combustion engine wherein the internal combustion engine has a crankcase in which there is rotatably supported a crankcase in which there is rotatably supported a crankshaft, to which there is articulated at least one connecting rod, which bears a piston that is movable in a cylinder head covered by a cylinder so as to form a working space. An air-gas mixture is supplied to the working space by way of breathing ducts in the cylinder head. A prechamber is recessed into the cylinder head and an ignition chamber is provided in the prechamber. The ignition chamber is opened and closed by a valve.

BACKGROUND OF THE INVENTION

The internal combustion engine shown in U.S. Pat. No. 5,067,458 has a main combustion chamber and an auxiliary combustion chamber inter-connected by a connecting duct. An ignition device is inserted into the auxiliary combustion chamber. The connecting duct can be blocked in order to decouple the ignition device from the main combustion chamber. By this prior art construction, the purging process between the auxiliary combustion chamber and the main combustion chamber is coupled to the ignition time and the auxiliary combustion chamber must be connected to the main combustion chamber over a long working period.

Another ignition system for an internal combustion engine is known from German patent document DE-OS 28 26 807. In this internal combustion engine, in successive working strokes, first an oxygen-containing mixture is compressed and thereby heated as well as thereafter ignited, whereupon the combustion gases expand. This working method is developed because at least part of the fuel employed is heated to at least its ignition temperature before introduction into the process, then injected in the gaseous state into the oxygen-containing mixture in accordance with a law governing the combustion process. This method and a correspondingly designed internal combustion engine require a large constructional effort and are thus expensive in implementation, the ignition control, or respectively, ignition of the mixture still being subject to fluctuations.

Another system is known from British patent GB-A 2, 031 513, which discloses a two-substance system, wherein, pilot fuel is supplied to the internal combustion engine via an injector nozzle, which pilot fuel is ignited by a spark plug. This ignited pilot fuel then ignites the main fuel located in another chamber.

OBJECT AND SUMMARY OF THE INVENTION

It is an object of the invention to furnish an internal combustion engine and a method for operating the internal combustion engine that permits a very exact and reliable determination of the ignition time of the working substance.

According to the invention, this object is achieved by providing an ignition chamber (including ignition device) which is inserted into the prechamber. The ignition chamber can be selectively closed off from the working space at certain times and connected to the working space at other times in order to ignite working substance newly supplied to the working space. The internal combustion engine designed for this method is distinguished in that an ignition chamber is inserted into the prechamber and the ignition chamber can be tightly sealed off from the working space via the prechamber, and in that the ignition chamber contains the ignition device. Reliable initiation and stable combustion of the working substance, which in the supplied state consists of a fuel-air mixture, is guaranteed by this method and this design. The fuel-air mixture is preferably a gas-air mixture, and the present invention is especially useful in stationary gas engines. The known spark ignition for Otto-cycle engines has the disadvantage that flame-core formation and the resulting combustion is subject to strong cyclical fluctuations. In the likewise known method of glow-plug ignition, a combustible gas-air mixture in the combustion chamber is initiated by a glow plug with a high surface temperature, stable initiation being possible but the initiation time fluctuating. Glow-plug ignition can be embodied both with and without temperature control for the incandescent element. The embodiment with temperature control has shorter, but still relatively unreproducible, initiation times. These disadvantages and problems are avoided by the present invention. It has been shown that the newly supplied working substance can be reliably and dependably ignited or initiated by means of the ignition device that can be closed off in the ignition chamber. It is crucial that, at the time of desired ignition (the ignition time), the ignition chamber is connected to the working space, so that steady-state conditions prevail at the ignition device essentially up to the time of ignition. Very good reproducibility of the initiation time is achieved, because, as a result of the relatively large contact area between the mixture to be ignited and the incandescent surface of the incandescent body, a flame core is formed that is several times larger than a flame core initiated by a spark ignition. This much larger flame core liberates far more energy because of the chemical combustion reaction taking place therein than is transported out of the flame core to the environment by heat losses. The flame core is therefore inherently stable. By this construction it is as if the cyclical fluctuations that are typical of the spark-ignition Otto-cycle engine were eliminated. Further, the energy to be supplied to the ignition device can be reduced in comparison with a known ignition device, by which construction the service life of the ignition device is prolonged. With regard to the term initiation time used previously, it should be stated that as generally defined this is the time interval between the ignition time and the time at which 1% of the mixture has reacted. In conventional spark ignitions, the ignition time can be established in an exactly definable way with high reproducibility, which permits reliable ignition control. The initiation time in conventional spark ignitions, however, has poor reproducibility (fluctuations in the 1% reaction time). By using the ignition device according to the invention, it is possible to realize a highly reproducible initiation time while maintaining a highly reproducible ignition time.

In development of the invention, a valve closing the ignition chamber off from the working space is opened in order to begin ignition. Depending on the design of the internal combustion engine, the ignition chamber is located immediately adjacent to the working space or in a prechamber that adjoins the working space.

In development of the invention, the valve is closed after ignition has taken place. For this purpose a time is chosen that is optimized with respect to complete initiation of the working substance in terms of consumption and exhaust emission in accordance with the applicable requirements. Because the same pressure prevails both in the working space and in the prechamber, no large valve-closing or, respectively, valve-opening forces arise.

In development of the invention, the ignition chamber is thermally insulated on the inner wall. By this construction it is achieved that, on the one hand, the radiation losses of the ignition device between two successive working cycles are very slight and, on the other hand, there is no additional thermal burden on the adjacent components, particularly on the cylinder head.

In development of the invention, the ignition chamber can be closed off from the prechamber or, respectively, the working space by use of a valve, and the valve is controlled by a hydraulically and/or electrically operable control element. The selection of hydraulic and/or electrical operation is made according to the circumstances of the internal combustion engine in question, a role being played in particular by the size of the valve and the hydraulic system availability.

In development of the invention, the hydraulic system is a high-pressure system, a solenoid-actuated valve being included in the setting and/or resetting line to the control element. The solenoid-actuated valve includes a pilot valve that controls a high-pressure line in such fashion that the high-pressure line can be connected to a low pressure line. The solenoid-actuated valve is, if appropriate, a known and tested valve from injection technology, which is used to control injection in the high-pressure fuel system in injection technology. The pilot valve is actuated by a solenoid, is arranged in an appropriate valve body transversely to the setting and/or resetting line, and in the closed state permits unhindered flow in the high-pressure line via an annular space in the valve body. In the open state of the pilot valve, this high-pressure line is then connected, via a restriction to the pilot valve, to a low-pressure line arranged laterally next to the high-pressure line. Thus a certain minimum pressure remains present in the overall system even in the open state.

It should be noted that in the control according to the invention, a digital temperature control—implemented by use of a digital signal processor—is used for the incandescent body. Very exact control is made possible by this construction.

BRIEF DESCRIPTION OF THE DRAWING

Further advantageous developments of the invention can be inferred from the drawing, which illustrates an exemplary embodiment described in more detail in the description that follows.

DETAILED DESCRIPTION OF THE INVENTION

The illustrated internal combustion engine includes a crankcase 1 in which a crankshaft 2 is rotatably supported.

Attached to the crankshaft 2 is a connecting rod 3, which bears a piston 4, which is movable in a cylinder liner 5. The cylinder liner 5 or, respectively, the crankcase 1 is closed from above by a cylinder head 6, a working space 7 being formed between the piston 4 and the cylinder head 6.

The intake and exhaust of the working substance in the form of gas and air takes place via an ordinary breathing apparatus having camshaft 8, partially shown valve drive 9, and partially shown breathing ducts 10.

Recessed in the cylinder head 6 is a prechamber 11, into which an ignition chamber 21 is inserted. An ignition device 22 in the form of a spark plug or glow plug is inserted into the ignition chamber 21, which ignition device is operated in a controlled fashion during the operation of the internal combustion engine. The ignition chamber 21 can further be closed off from the prechamber 11 by a valve 12. The valve 12 is actuated by a control element 13, which in turn is controlled by a solenoid-actuated valve 14. The solenoid-actuated valve 14 is driven by an electronic control mechanism 15. The control mechanism 15 can also control all other engine functions, in particular also the ignition device. The solenoid-actuated valve 14 controls a high-pressure line 16*a*, 16*b*, via which hydraulic fluid, in particular oil, is conveyed from a reservoir 17 to the control element 13. The reservoir 17 is filled with hydraulic fluid from a tank 20 by a pump 18, which is driven by, for example, an electric motor 19. The solenoid-actuated valve 14 in this design embodiment has a dual control function. In the control process initiating ignition, the connection between the reservoir 17 and the pressure cylinder located in the control element 13 is cleared and the connection between the pressure cylinder and the tank return is blocked. In this control state, a piston located in the pressure cylinder will open the connection between the ignition chamber 21 and the working space 7 (control state I). In the control process that ends ignition, the connection between the reservoir 17 and the pressure cylinder located in the control element 13 is blocked and the connection between the pressure cylinder and the tank return is cleared. The piston is pushed back by a return spring and thus closes the connection between ignition chamber 21 and working space 7.

OPERATION

The mode of operation of the internal combustion engine according to the invention is a follows. First, the internal combustion engine is a gas engine operating by the four-cycle process and having a plurality of cylinder units. Supplied working substance in the form of an air-gas mixture is compressed in the working space 7 by the piston 4 and must be ignited in the region of the firing top dead center position of the reciprocating piston. This takes place by operation of the ignition device 22 arranged in the ignition chamber 21. In the time interval shortly before the desired ignition of the fresh mixture located in the working space 7 (and also the prechamber 11), the valve 12 is opened by the piston of the pressure cylinder in the control element 13 upon the latter being energized by the control mechanism 15, so that the fresh mixture enters the ignition chamber 21 and is ignited by the ignition device. After ignition has taken place, the valve 12 is closed again (the control mechanism 15 de-energizes the control element 13 and the return spring closes the valve 12) and thus the ignition device is separated from the working space until the next working cycle.

What is claimed is:

1. In an internal combustion engine having a crankcase in which there is a rotatably supported crankshaft, to which there is articulated at least one connecting rod, which bears a piston that is movable in a cylinder covered by a cylinder head so as to form a working space, said cylinder head including ducts from supplying an air/gas mixture to the working space, the combination comprising:

a prechamber (11) recessed into said cylinder head and in free flow communication with said working space (7), an ignition chamber (21) extending downwardly from said cylinder head and into said prechamber (11) whereby the major portion of the exterior of said ignition chamber is exposed to the combustion gases in said prechamber, a flow control device including a valve (12) in said ignition chamber (21) having an open position in which said ignition chamber is in free flow communication with said working space (7) and a closed position in which said ignition chamber (21) is closed, a control mechanism for cyclically opening and closing said valve (12), said control mechanism opening said valve (12) near the top dead center position of said piston at the end of the compression stroke of said piston and subsequently closing said valve (12) during combustion of said compressed air/gas mixture prior to completion of the power stroke of said piston, and an ignition device (22) in said ignition chamber (21) operable to ignite said compressed air/gas mixture upon opening of said valve (12).

2. The internal combustion engine of claim 1 wherein said ignition chamber (21) includes an interior wall and wherein said interior wall is thermally insulated.

3. The internal combustion engine of claim 1 wherein said control mechanism for operating said valve (12) includes a control element (13) in actuating relation to said valve (12).

4. The internal combustion engine of claim 3 wherein said flow control device includes a high pressure hydraulic control and wherein said control mechanism includes a solenoid-actuated valve (14) operable to actuate said control element (13).

* * * * *